United States Patent
Levy et al.

(10) Patent No.: US 6,226,125 B1
(45) Date of Patent: May 1, 2001

(54) ELECTRO-OPTICAL SYSTEM HAVING A BALL TURRET AND AN EXTERIOR THERMAL REFERENCE SOURCE

(75) Inventors: Israel D. Levy, Los Angeles; Armando A. Molina, Jr., Lakewood, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/377,474

(22) Filed: Aug. 19, 1999

(51) Int. Cl.[7] .................................................. G02B 27/10
(52) U.S. Cl. .......................... 359/618; 250/200; 250/201.8
(58) Field of Search ......................... 359/618; 250/201.2, 250/201.7, 201.8, 200, 203.6

(56) References Cited

U.S. PATENT DOCUMENTS

| | | | |
|---|---|---|---|
| H1066 | * 6/1992 | Petropoulos et al. | 250/338.5 |
| 4,123,134 | * 10/1978 | Meyers | 359/618 |
| 5,796,474 | * 8/1998 | Squire et al. | 356/152.1 |
| 5,936,771 | * 8/1999 | Cooper | 359/618 |

* cited by examiner

Primary Examiner—Huy Mai
(74) Attorney, Agent, or Firm—Colin M. Raufer; Leonard A. Alkov; Glenn H. Lenzen, Jr.

(57) ABSTRACT

An electro-optical system comprising a turret and a thermal reference source that is located exterior to the turret. The turret houses a detector array and optical elements that provide different fields of view for the detector array. One or more windows are provided in the turret through which energy passes to the detector array. The optical elements and detector are moveable or rotatable so that the detector array may view the exterior thermal reference source for calibration purposes and an image scene during normal operation.

5 Claims, 1 Drawing Sheet

ELECTRO-OPTICAL SYSTEM HAVING A BALL TURRET AND AN EXTERIOR THERMAL REFERENCE SOURCE

BACKGROUND

The present invention relates generally to electro-optical systems, and more particularly, to an electro-optical system having a ball turret and an exterior thermal reference source.

Typically, one or more thermal reference source(s) are an integral part of a sensor assembly used in an electro-optical system, such as those manufactured by the assignee of the present invention. Each thermal reference source(s) is placed within the field-of-view of a detector by repositioning a mirror and extending the travel of a scanner. This requires unnecessary modification of various components of the system. It would be desirable to eliminate such additional complications.

Three field of view electro-optical systems typically use reflective optics for all three (wide, medium and narrow) fields of view to ensure that the optical transmission characteristics are substantially equal in all fields of view. Calibrating the detector by viewing a thermal reference source using medium field of view optics is of little use if the transmission characteristics of wide and narrow fields of view optics are substantially different than those of the medium field of view optics. It would be desirable to have a system that improves upon the ability to calibrate the system.

Thermal reference sources are typically used with staring detector arrays, such as those used on INPP and V22 systems, for example, developed by the assignee of the present invention. However, moving mirrors have not been used to place those thermal reference sources within the field of view of the detector.

Other electro-optical systems use a shutter as a uniform temperature thermal reference source. The temperature of the shutter is typically not controlled and is not preferred for use in advanced electro-optical systems.

Accordingly, it is an objective of the present invention to provide for an improved multiple field of view electro-optical system employing a ball turret and an exterior thermal reference source.

SUMMARY OF THE INVENTION

To accomplish the above and other objectives, the present invention provides for an electro-optical system comprising a turret and a thermal reference source that is located exterior to the turret. The turret houses a detector array and optical elements that provide different fields of view for the detector array. The optical elements and detector array are moveable or rotatable so that the detector may view the exterior thermal reference source for calibration purposes and an image scene during normal operation.

The turret has a window through which the detector views the image scene and exterior thermal reference source. The turret is rotatable to move the field of view of the detector and selected optical elements so that the detector views either the exterior thermal reference source or the image scene.

The sensitivity of each detector element of the detector array is calibrated by flooding the detector array with a uniform source of illumination derived by pointing the detector array at the exterior thermal reference source. The calibration data, comprising gain and offset corrections associated with each detector element necessary to yield a uniform image, are electronically recorded. The gain and offset corrections are subsequently applied to the output of the detector array when viewing external scenes to obtain a better quality image.

BRIEF DESCRIPTION OF THE DRAWINGS

The various features and advantages of the present invention may be more readily understood with reference to the following detailed description taken in conjunction with the accompanying drawings, wherein like reference numerals designate like structural element, and in which.

DETAILED DESCRIPTION

Figure 1:
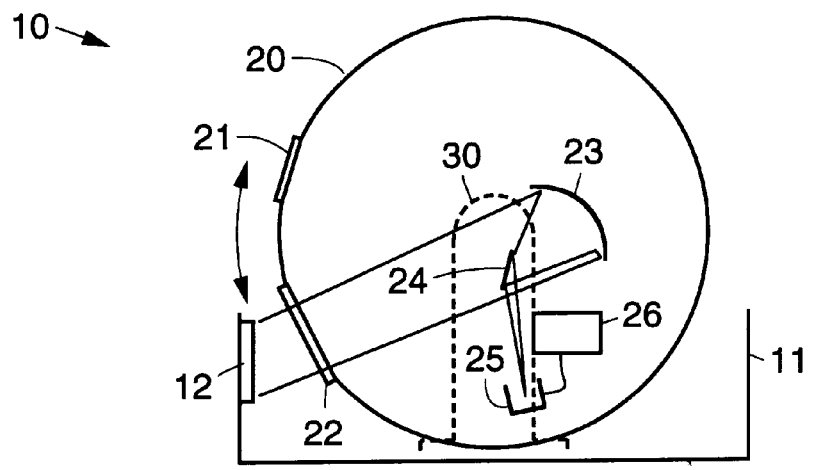
FIG. 1 illustrates an exemplary electro-optical system in accordance with the principles of the present invention configured in a calibration mode.
Figure 2:
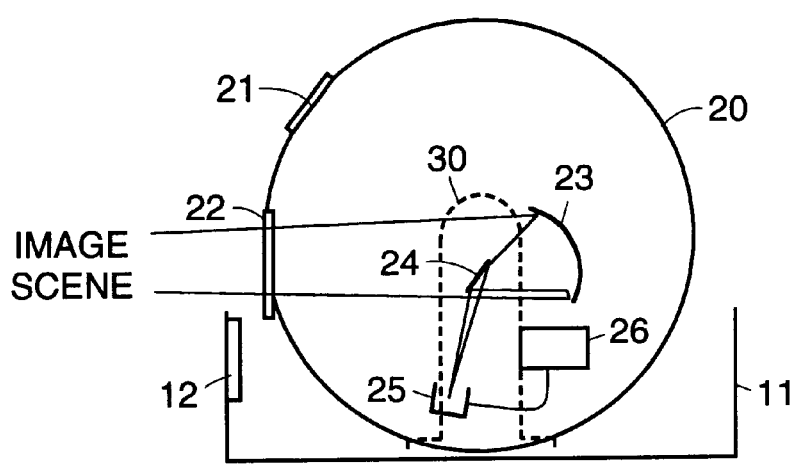
FIG. 2 illustrates another view of the exemplary electro-optical system of FIG. 1 configured in normal operating mode.

Referring to the drawing figures, FIG. 1 illustrates an exemplary electro-optical system 10 in accordance with the principles of the present invention. The electro-optical system 10 shown in FIG. 1 is configured in a calibration mode. FIG. 2 illustrates another view of the exemplary electro-optical system 10 shown in FIG. 1 that is configured in normal operating mode.

A reduced to practice embodiment of the exemplary electro-optical system 10 is a three field of view turret forward looking infrared (FLIR) system 10. The turret FLIR system comprises a ball turret 20, which is a ball-like mechanical structure located within a set of gimbals (not shown) that couple the turret 20 to a base 11.

The turret 20 is rotatable in azimuth and elevation to permit viewing of an image scene forward, aft, to the sides and below a platform (aircraft or helicopter, for example) on which the system 10 is mounted. A thermal reference source 12 is located exterior to the ball turret 20 and is disposed on an inner surface of the base 11. An elevation gimbal 30 is used to rotate the field of view in front of the thermal reference source 12.

The ball turret 20 comprises a detector array 25 and optical elements 23, 24 that provide different fields of view for the detector 25. The optical elements 23, 24 and detector array 25 are moveable or rotatable so that the detector array 25 may view the exterior thermal reference source 12 for calibration purposes and an image scene during normal operation. The detector array 25 views the thermal reference source 12 and image scene through a window 22 in the ball turret 20.

In the reduced to practice embodiment of the exemplary electro-optical system 10, the ball turret 20 houses three sets of optical elements 23, 24 (only one is shown) that comprise wide, narrow and medium field of view optics. In the reduced to practice system 10, the wide and narrow field of view optics are substantially different than those of the medium field of view optics. A second window 21 may be provided in the turret for use when the system 10 is configured in narrow field of view mode.

The respective wide, narrow and medium field of view optics focus infrared energy onto the detector array 25. Processing electronics 26 are mounted within the turret 20 and are electronically coupled to the detector array 25.

The turret is positioned by a servo system (not shown) which is controlled by the processing electronics 26, so as to maintain line-of-sight stability when a platform (not shown)

on which the system 10 is disposed moves. Inertial reference sources (not shown) monitor the orientation of the turret 20, and command servo activity to compensate for changes in the pointing direction of the turret 20. Often, compensation is provided for variations in the sensitivity of each detector element within the detector array 25.

The sensitivity of each detector element of the detector array 25 is calibrated by rotating the detector array 25 so that it views the exterior thermal reference source 12. The detector array 25 is then flooded with a uniform source of illumination when it is pointed at the exterior thermal reference source 12. Calibration data, comprising gain and offset corrections associated with each detector element of the detector array 25 necessary to yield a uniform image, are electronically recorded by the processing electronics 26. The gain and offset corrections are subsequently applied to the output of the detector array 25 when viewing an external image scene to obtain a better quality image.

Placing optical elements 23, 24 for a three field-of-view system within a ball turret 20 designed for a two field of view system presents special problems, particularly because space is limited within the turret 20. In a specific initial application of the present invention, the only economical location for the optical elements 23, 24 for the third (medium) field of view was in a position occupied by a thermal reference source located within the turret 20.

Optical ray trace diagrams for the reduced to practice three field-of-view system indicate that the thermal reference source 12 can be viewed by the medium field of view optical elements 23, 24 without vignetting the optical bundle when the turret 20 is positioned to point at the thermal reference source 12. Typically, the turret 20 is pointed at the thermal reference source 12 when the system 10 is initially turned on. An operator may also manually command the system 10 to calibrate the detector array 25 at any time image uniformity appears to be degraded.

The reduced to practice embodiment of the three field-of-view system was tested. When the ball turret 20 was manually pointed at the thermal reference source 12, full and touch-up calibration of the detector array 25 worked properly.

The present invention enables more compact packaging of a turreted sensor, eliminates the need for an additional moving mirror, and facilitates rapid flow of heat into or out of the thermal reference source. The present invention also enables the use of existing two field of view optics in a three field of view electro-optical system. This commonality leads to lower costs and reduced spare parts inventories.

The principles of the present invention provide for repositioning the thermal reference source 12 used in two field of view systems, which eliminates a mirror that was previously required to place the interiorly located thermal reference source in the field of view of the detector array 25. The thermal reference source 12 is disposed on a large frame of the turret base 11 which provides a better heat sink for the heat generated by the thermal reference source 12. The large frame of the turret base 12 is better able to dissipate the heat required to keep the thermal reference source 12 above ambient temperature than the internal structure of the ball turret 20.

The present invention may be utilized in conjunction with any two or three field of view turret FLIR system 10. Current applications for the present invention include helicopters, fixed wing aircraft, and pod mounts on ships. One potential application for the present invention is the V-22 system, should it be desired to replace the currently used two field of view system with a three field of view system.

Thus, an improved multiple field of view electro-optical system employing a ball turret and an exterior thermal reference source has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. An electro-optical system comprising:

a base;

a thermal reference source disposed on the base; and a rotatable turret disposed on the base that comprises a detector array and a plurality of optical elements that provide different fields of view for the detector array, and a window through which the detector array views an image scene and the thermal reference source when the turret is rotated.

2. The electro-optical system recited in claim 1 wherein rotatable turret comprises a rotatable ball turret.

3. The electro-optical system recited in claim 1 further comprising:

processing electronics coupled to the detector array for electronically recording the sensitivity of detector elements of the detector array during calibration in the form of gain and offset corrections associated with each detector element necessary to yield a uniform image, which gain and offset corrections are applied to the output of the detector array when viewing the image scene.

4. The electro-optical system recited in claim 2 further comprising:

processing electronics coupled to the detector array for electronically recording the sensitivity of detector elements of the detector array during calibration in the form of gain and offset corrections associated with each detector element necessary to yield a uniform image, which gain and offset corrections are applied to the output of the detector array when viewing the image scene.

5. An electro-optical system comprising:

a base;

a thermal reference source disposed on the base;

a rotatable turret disposed on the base that comprises a detector array and a plurality of optical elements that provide different fields of view for the detector array, and a window through which the detector array views an image scene and the thermal reference source when the turret is rotated; and processing electronics coupled to the detector array for electronically recording the sensitivity of detector elements of the detector array during calibration in the form of gain and offset corrections associated with each detector element necessary to yield a uniform image, which gain and offset corrections are applied to the output of the detector array when viewing the image scene.

* * * * *